United States Patent
Kwon (10) Patent No.: US 9,634,470 B2
(45) Date of Patent: Apr. 25, 2017

(54) METHOD OF CONSTRUCTING A DISTRIBUTION LINE USING AN EXTRA-HIGH VOLTAGE NEUTRAL LINE

(71) Applicant: DAEWON ELECTRIC CO., LTD., Jincheon-gun, Chungcheongbuk-do (KR)

(72) Inventor: Sae Won Kwon, Chungcheongbuk-do (KR)

(73) Assignee: DAEWON ELECTRIC CO., LTD, Jincheon-gun, Chungcheongbuk-do (KR)

( * ) Notice: Subject to any disclaimer, the term of this patent is extended or adjusted under 35 U.S.C. 154(b) by 194 days.

(21) Appl. No.: 14/433,359

(22) PCT Filed: Jun. 9, 2014

(86) PCT No.: PCT/KR2014/005035
§ 371 (c)(1),
(2) Date: Apr. 2, 2015

(87) PCT Pub. No.: WO2015/141894
PCT Pub. Date: Sep. 24, 2015

(65) Prior Publication Data
US 2016/0181771 A1    Jun. 23, 2016

(30) Foreign Application Priority Data
Mar. 19, 2014 (KR) .......... 10-2014-0031999

(51) Int. Cl.
*H02G 7/20* (2006.01)
*H02G 1/04* (2006.01)
(Continued)

(52) U.S. Cl.
CPC ............... *H02G 1/04* (2013.01); *H02G 7/205* (2013.01); *H02G 7/22* (2013.01); H02G 1/02 (2013.01)

(58) Field of Classification Search
CPC    H02G 1/02; H02G 1/04; H02G 7/206; H02G 7/22
See application file for complete search history.

(56) References Cited

U.S. PATENT DOCUMENTS 4,142,178 A * 2/1979 Whyte ..................... H04B 3/56
307/149

FOREIGN PATENT DOCUMENTS

KR    10-0725382 B1    6/2007

* cited by examiner

*Primary Examiner* — Carl Arbes
(74) *Attorney, Agent, or Firm* — Novick, Kim & Lee, PLLC; Jae Youn Kim

(57) ABSTRACT

The present invention relates to a distribution line, and more particularly, to a method of constructing a distribution line using an extra-high voltage neutral line combined with an overhead earth wire having a separate installation structure of the extra-high voltage neutral line and a low-voltage neutral line for improving electric power quality, in which a distribution line simultaneously perform functions of an overhead earth wire for shielding lightning, an extra-high voltage neutral line for returning unbalanced currents and fault currents and an optical communication line for establishing a communication network, such that a number of disconnections of power lines is reduced by reducing surge voltage thereby achieving excellent lightning shielding effects such as improved power quality, etc., construction costs are reduced, load is reduced, construction quality is improved, and aesthetic features of the urban area is improved by simplifying the distribution equipment.

10 Claims, 6 Drawing Sheets

(51) Int. Cl.
*H02G 7/22* (2006.01)
*H02G 1/02* (2006.01)

METHOD OF CONSTRUCTING A DISTRIBUTION LINE USING AN EXTRA-HIGH VOLTAGE NEUTRAL LINE

TECHNICAL FIELD

The present invention relates to a distribution line, and more particularly, to a method of constructing a distribution line using an extra-high voltage neutral line combined with an overhead earth wire having a separate installation structure of an extra-high voltage neutral line and a low-voltage neutral line, in which a lightning shielding effect of a distribution line is improved, distribution equipment is simplified, an overhead earth wire is prevented from disconnection, a transformer secondary neutral wire is prevented from disconnection, and a disconnection due to a connection between different types of metals of a secondary lightning conductor (copper) and an extra-high voltage neutral line (aluminum) is prevented.

BACKGROUND ART

In a domestic 22.9 KV-Y distribution system, an overhead earth wire support is used for lightning shielding and an overhead earth wire is installed in a bitt shape, which is vulnerable to natural disasters, on an upper power of an extra-high voltage power line, and an extra-high voltage neutral line, which is a return path of an unbalanced current or a fault current, is installed below the extra-high voltage power line.

The overhead earth wire and the extra-high voltage neutral line are connected to each electric pole to perform same functions of an electric parallel circuit of a circuit grounded at 50 ohm or less at an interval of 200 m. However, the overhead earth wire and the extra-high voltage neutral line may be redundantly installed at different positions of the electric pole together with a communication line facility, so the load applied to the electric pole may be increased. In addition, the overhead earth wire uses a galvanized steel stranded cable having a high impedance, thus the wire is frequently disconnected because the wire deteriorates from lightning, unbalanced currents and fault currents, so the construction must be performed by taking into consideration the type, thickness and conductivity of the wire. Further, when a low-voltage load current exceeds an allowable current of the extra-voltage neutral line in a low-voltage jointed area, in which the transformer is installed and the extra-high voltage neutral line and the low-voltage neutral line are used together, a secondary neutral line connecting point of the transformer may become disconnected.

Figure 1:
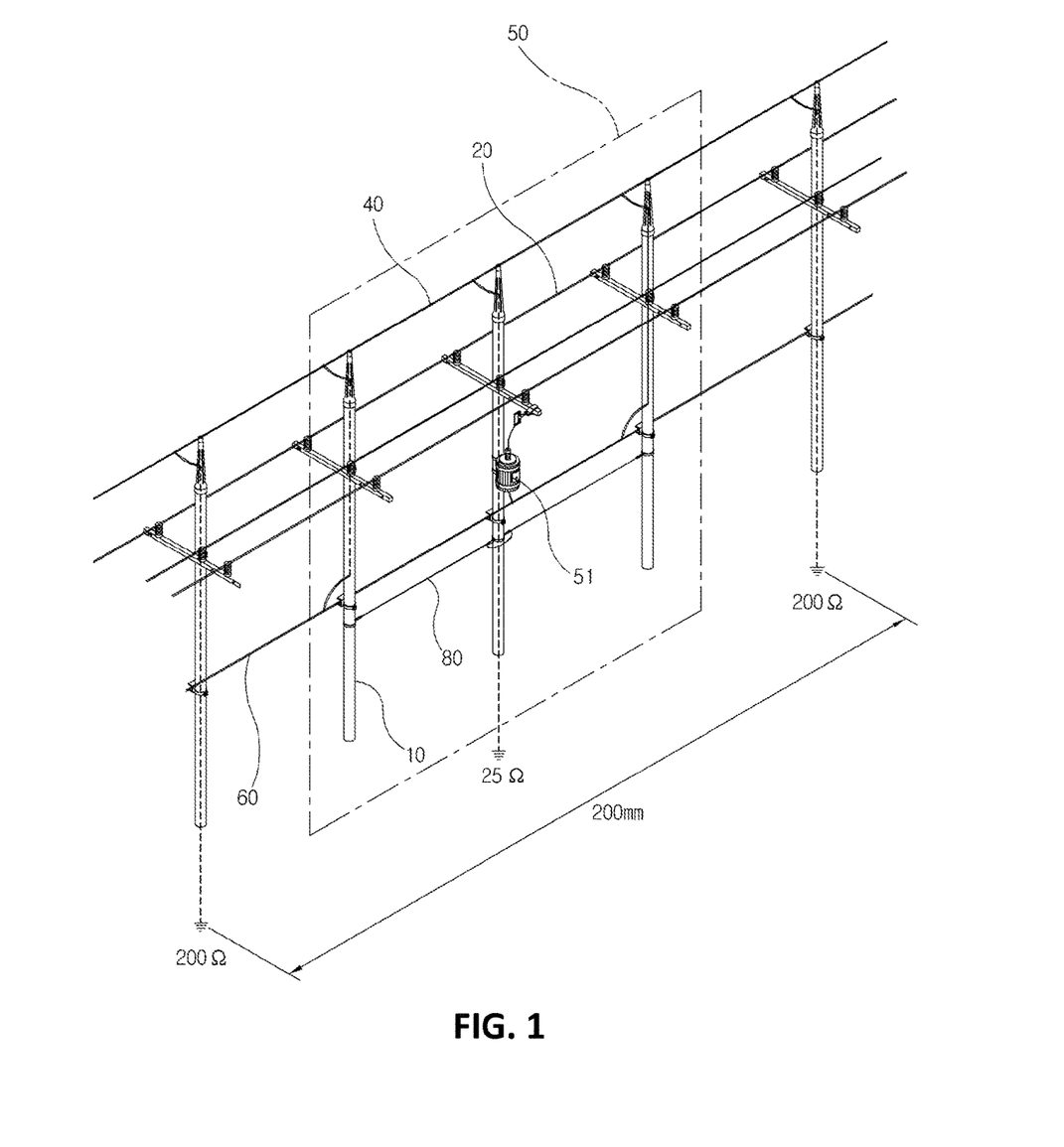
FIG. 1 is a schematic view illustrating a typical distribution line.

According to an existing distribution line, as illustrated in FIG. 1, in case of equipment and a pole of an existing 22.9 KV-Y extra-high voltage distribution line, an overhead earth wire 40 is installed at a top of an electric pole in a bitt shape by using a galvanized steel stranded cable (FS22 mm$^2$) and an overhead earth wire support, a power line 20 is installed at an upper part of the electric pole 10, a transformer 51 is installed in a low-voltage jointed area 50 of the power line 20, and a low and extra-high voltage neutral line 60 and a low-voltage line 80 are installed below the transformer 51 in the low-voltage jointed area 50.

In this case, the extra-high voltage neutral line 60 uses an aluminum cable steel reinforced (ACSR) wire having a thickness the same as or one-level lower than the thickness of the power line 20.

In addition, a bare hard-drawn copper wire WO is used for the extra-high voltage neutral line in places where wire corrosion is severe due to salt such as coastal areas.

In addition, when a low-voltage load current exceeds an allowable current of the extra-voltage neutral line in a low-voltage jointed area, in which the transformer is installed and the extra-high voltage neutral line and the low-voltage neutral line are used together, a secondary neutral line connecting point of the transformer may disconnect. Therefore, in urban areas, the low-voltage neutral line is added or a bare hard-drawn copper wire WO, which has a high allowable current, is used for the extra-high voltage neutral line to prevent the secondary neutral line connection point of the transformer from being disconnected.

Meanwhile, in a 22.9 KV-Y neutral line multiple ground system, the number of ground places and a ground resistance value may exert great influence upon the lightning shielding, so the typical overhead earth wire and the extra-high voltage neutral line are connected to each electric pole and are grounded at 50 ohm or less at an interval of every 200 m (3 to 4 span) and the electric pole, in which the transformer is installed, is grounded at 25 ohm or less.

However, in the existing distribution line, the overhead earth wire may be disconnected due to overheating and deterioration, and unbalanced return currents may flow during lightning and normal conditions.

In addition, the secondary neutral line connecting point of the transformer becomes disconnected in the low-voltage jointed area due to the use of the extra-high voltage neutral line and the low-voltage neutral line together and the disconnection due to the connection between different types of metals of a secondary lightning conductor (copper) and an extra-high voltage neutral line (aluminum) has frequently occurred.

In addition, when installing communication lines with the distribution line, the distribution line becomes complex because the communication line is installed at the position of the extra-high voltage neutral line so the aesthetic feature of the urban area may deteriorate and construction costs may be excessively consumed, and due to the increase in independent communication networks, the load applied to the electric pole by the communication line and the electric line increases thus increasing the number of broken electric poles.

Meanwhile, the applicant has filed the Korean Registered Patent No. 10-0725382, which discloses an electric pole having neutral line combined with overhead earth wire and distribution method using the same. In the patent, an electric pole, in which the overhead earth wire and the neutral wire can be used by one electric power line without a danger of increase in surge voltage from direct lightning strokes, is provided, such that the neutral line can be used as the overhead earth line so the construction cost can be reduced, the line is simplified so the weight of the support material can be reduced, and a lack of a ground clearance of the neutral line can be solved.

Meanwhile, in current power businesses, the needs for establishing its own information communication network by the power supply company due to distribution automation, smart grid, etc. are increasing, and due to these needs, each communication company is permitted to install the communication line along with the power line on the electric pole, allows the communication line to be separately installed with the distribution line, and the power supply company leases the installed communication line for its own information communication network.

However, to establish the communication line, a separate communication line is required to be separately installed from the overhead earth wire and the neutral line. Accordingly, the degree of fatigue of the distribution electric pole increases due to the communication equipment installed with the power line, which exceeds the allowable load of the distribution line, thus increasing cracks and crumbling of the electric poles, In addition, construction costs and aesthetic feature of the urban area may be degraded, and specifically, the distribution electric pole licensee is required to separately pay a lease cost of the distribution automation communication line to the communication company.

Further, the integrated overhead earth wire and neutral line is grounded at 50 ohm at a span of 200 m, so the number of ground areas is small, but work required for lowering the ground resistance value is difficult.

As related arts, there is Korean Registered Patent No. 10-0725382.

DISCLOSURE

Technical Problem

The present invention is provided to solve the problems described above, and an object of the present invention is to provide a method of constructing a distribution line using an extra-high voltage neutral line combined with an overhead earth wire having a separate installation structure of an extra-high voltage neutral line and a low-voltage neutral line, in which a distribution line simultaneously performs functions of an overhead earth wire for shielding lightning, an extra-high voltage neutral line for returning unbalanced currents and fault currents and an optical communication line for establishing a communication network, such that a number of disconnections of power lines is reduced by reducing surge voltage, thereby achieving excellent lightning shielding effects such as improved power quality, etc., construction costs are reduced, load is reduced, construction quality is improved, and aesthetic feature of the urban area is improved by simplifying the distribution equipment, and the overhead earth wire, the extra-high voltage neutral line and the optical communication line are prevented from being disconnected.

In addition, another object of the present invention is to provide a method of constructing a distribution line using an extra-high voltage neutral line combined with an overhead earth wire having a separate installation structure of an extra-high voltage neutral line and a low-voltage neutral line, in which the communication companies can achieve high profits by lending the optical communication lines, and the power equipment can provide high added value by reducing communication line leasing costs through securing its own communication networks.

Furthermore, yet another object of the present invention is to provide a method of constructing a distribution line using an extra-high voltage neutral line combined with an overhead earth wire having a separate installation structure of an extra-high voltage neutral line and a low-voltage neutral line, in which the power quality is improved by preventing the secondary neutral line connecting point of the transformer from being disconnected due to a separation of the extra-high voltage neutral line and the low-voltage neutral line and preventing the disconnection from occurring due to a connection between different types of metals of a secondary lightning conductor (copper) and an extra-high voltage neutral line (aluminum).

Technical Solution

To achieve the object, provided is a method, in which a distribution line includes a power line provided at an upper part of an electric pole through a crossarm having an insulator, an overhead earth wire provided at an upper end of the electric pole, a transformer provided below the power line and positioned at a low-voltage jointed area, a low-voltage neutral line combined with an extra-high voltage neutral line provided below the transformer in parallel with the power line, and a low-voltage line provided at a position corresponding to the low-voltage jointed area, the method including: separating the low-voltage neutral line and the extra-high voltage neutral line, configuring the overhead earth wire and the extra-high voltage neutral line into an integrated overhead earth wire and extra-high voltage neutral line and installing the integrated overhead earth wire and extra-high voltage neutral line on a top end of the electric pole by using a multi-cap; connecting the transformer and the integrated overhead earth wire and extra-high voltage neutral line by installing the low-voltage neutral line and the low-voltage line so that the low-voltage neutral line and the low-voltage line are connected to a low-voltage load part of the electric pole, in which the transformer is installed, below the transformer in the low-voltage jointed area such that a low-voltage load current is prevented from flowing through the integrated overhead earth wire and extra-high voltage neutral line; and installing a ground at the electric pole, in which the transformer of the low-voltage jointed area connected to the integrated overhead earth wire and extra-high voltage neutral line is installed, and at the electric pole in which an arrester or a switch is installed and ground-connecting the integrated overhead earth wire and extra-high voltage neutral line to the remaining electric pole so that the ground is installed to every electric pole.

Advantageous Effects

The method of constructing a distribution line using an extra-high voltage neutral line combined with an overhead earth wire having a separate installation structure of an extra-high voltage neutral line and a low-voltage neutral line of the present invention configures the overhead earth wire, the neutral line and the optical communication line as one distribution line and allows the distribution line to be installed at a top end of the electric pole, such that a number of disconnections of power lines is reduced by reducing surge voltage, thereby achieving excellent lightning shielding effects such as improved power quality, etc., construction costs are reduced, load is reduced, construction quality is improved, and aesthetic feature of the urban area is improved by simplifying the distribution equipment.

In addition, the communication companies can achieve high profits by lending the optical communication lines, and the power equipment can provide high added value by reducing communication line leasing costs through securing its own communication networks.

Further, the overhead earth wire, the neutral line and the optical communication line are prevented from being disconnected, and the power quality is significantly improved by preventing the secondary neutral line connecting point of the transformer from being disconnected due to a separation of the extra-high voltage neutral line and the low-voltage neutral line at a low-voltage jointed area.

BEST MODE

All terms mentioned throughout this disclosure are defined based on the functions of what they represent in the present invention, and thus, their definitions may vary depending on user's and operator's intent or customs. Therefore, those terms should be defined based on the content of the present invention presented herein the present disclosure.

While the present invention has been particularly shown and described by embodiments with reference to the accompanied drawings, it should not be interpreted in any way to limit the scope of the present invention. Therefore, the scope of the present invention is not limited to the described embodiments, but is limited only by the accompanying claims and equivalents thereof, and any alterations equivalent to the accompanying claims are within the scope of the present invention.

Hereinafter, an exemplary embodiment according to the present invention is described with reference to the drawings.

Figure 2:
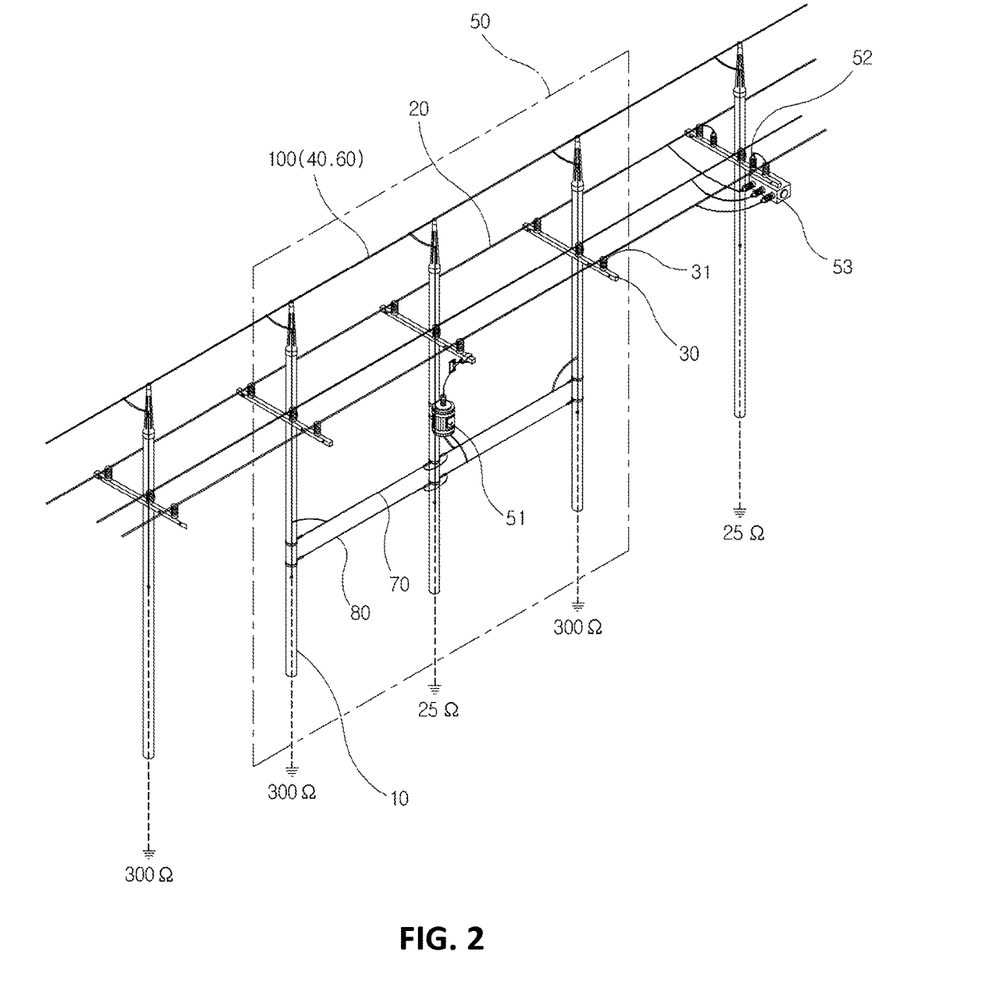
FIG. 2 is an overall perspective view illustrating a method of constructing a distribution line using an extra-high voltage neutral line combined with an overhead earth wire having a separate installation structure of an extra-high voltage neutral line and a low-voltage neutral line of the present invention.

FIG. 2 is an overall perspective view illustrating a method of constructing a distribution line using an extra-high voltage neutral line combined with an overhead earth wire having a separate installation structure of an extra-high voltage neutral line and a low-voltage neutral line of the present invention.

First, as illustrated in FIG. 2, the method of constructing a distribution line using an extra-high voltage neutral line combined with an overhead earth wire having a separate installation structure of an extra-high voltage neutral line and a low-voltage neutral line includes, as illustrated in FIG. 1, in which a distribution line includes a power line 20 provided at an upper part of an electric pole 10 through a crossarm 30 having an insulator 31, an overhead earth wire 40 provided at an upper end of the electric pole 10, a transformer 51 provided below the power line 20 and positioned at a low-voltage jointed area 50, a low-voltage neutral line combined with an extra-high voltage neutral line 60 provided below the transformer 51 in parallel with the power line 20, and a low-voltage line 80 provided at a position corresponding to the low-voltage jointed area, the method includes separating the low-voltage neutral line combined with the extra-high voltage neutral line 60 into the low-voltage neutral line 70 and the extra-high voltage neutral line 60, and configuring an integrated overhead earth wire and extra-high voltage neutral line (100) which simultaneously performs functions of the overhead earth wire 40 for shielding lightning and the extra-high voltage neutral line 60 for returning unbalanced currents and fault currents.

Then, the integrated overhead earth wire and extra-high voltage neutral line 100 is installed in a bitt shape by using a multi-cap 200 on the upper end of the electric pole 10.

In this case, the installed multi-cap 200 is preferably installed in such a manner that the insulator 31 and the power line 20 are within a lightning protection shielding angle of the integrated overhead earth wire and extra-high voltage neutral line 100 and maintain the shielding angle, and the multi-cap 200, as in the Registered Patent No. 10-1205711, which has been filed by the applicant, includes a coupling cap formed on a lower part to cover an upper end of the electric pole 10 and a plate formed at an upper part of the coupling cap, in which a clamp for fixing a wire is formed on an upper surface of the plate and multiple through holes are formed on a circumference of the plate.

Figure 3:
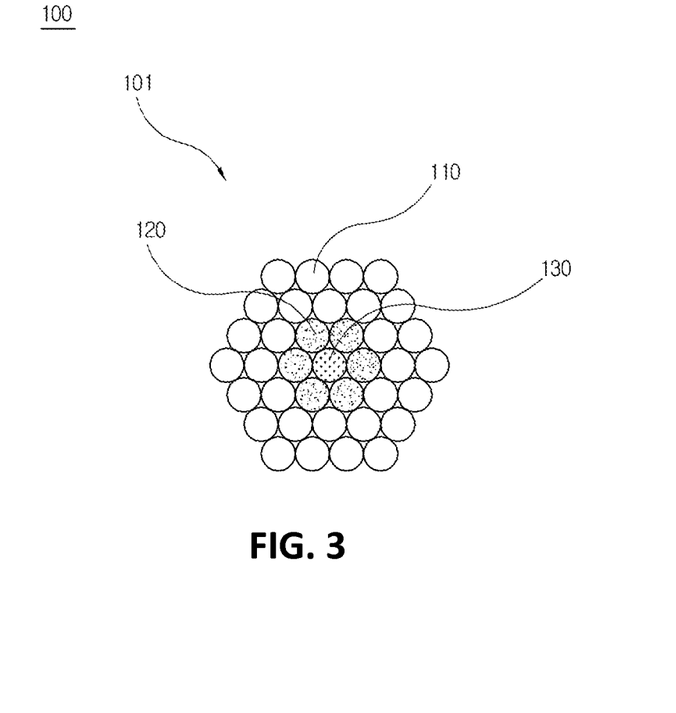
FIG. 3 view illustrating an example of an integrated optical neutral ground line of an integrated overhead earth wire and extra-high voltage neutral line of the method of constructing a distribution line using an extra-high voltage neutral line combined with an overhead earth wire having a separate installation structure of an extra-high voltage neutral line and a low-voltage neutral line of the present invention.

Meanwhile, the integrated overhead earth wire and extra-high voltage neutral line 100, as illustrated in FIG. 3, may include an integrated optical neutral ground line 101 including multiple aluminum wires 110 provided at an outermost circumference from a center part, multiple carbon steel wires 120 provided at an inner part of the aluminum wires 110 and an optical communication wire 90 provided between the carbon steel wires 120.

In addition, an aluminum tape 250 may be wrapped around a connection part of the multi-cap 200 of the integrated overhead earth wire and extra-high voltage neutral line 100 in a length of about 60 cm to cover the integrated overhead earth wire and extra-high voltage neutral line 100 such that the integrated overhead earth wire and extra-high voltage neutral line 100 is prevented from being damaged from vibration.

Further, the transformer 51 is installed below the power line at a position corresponding to the low-voltage jointed area 50, and the low-voltage neutral line 70 and the low-voltage line 80 are installed below the transformer so that the electric pole, on which the transformer 51 is installed, and the electric poled positioned at both neighboring low-voltage loads are connected.

In this case, the installed low-voltage neutral line 70 is connected to the integrated overhead earth wire and extra-high voltage neutral line 100 and the transformer 51, in this case, the low-voltage neutral line 70 has a circuit (not illustrate) separate from the integrated overhead earth wire and extra-high voltage neutral line 100, and the secondary neutral line connection point of the transformer 51 is prevented from disconnecting even when a surge current exceeds the allowable current of the integrated overhead earth wire and extra-high voltage neutral line 100.

In addition, a ground is connected by using a ground wire 220 with respect to the integrated overhead earth wire and extra-high voltage neutral line 100 for each electric pole 10.

In this case, among the electric poles 10, a grounding at 25 ohm or less is preferably performed for the electric pole 10, in which the transformer 51, an arrester 52, or a switch connected to the integrated overhead earth wire and extra-high voltage neutral line 100 is installed, and a grounding at 300 ohm or less is performed by directly grounding the integrated overhead earth wire and extra-high voltage neutral line 100 for the other electric poles 10.

Meanwhile, various installation methods may be applied according to electric pole types for the integrated overhead earth wire and extra-high voltage neutral line 100 and the electric poles may be classified as a pin type electric pole (straight line pole), and a strain type electric pole (angular pole) and installed.

Figure 4:
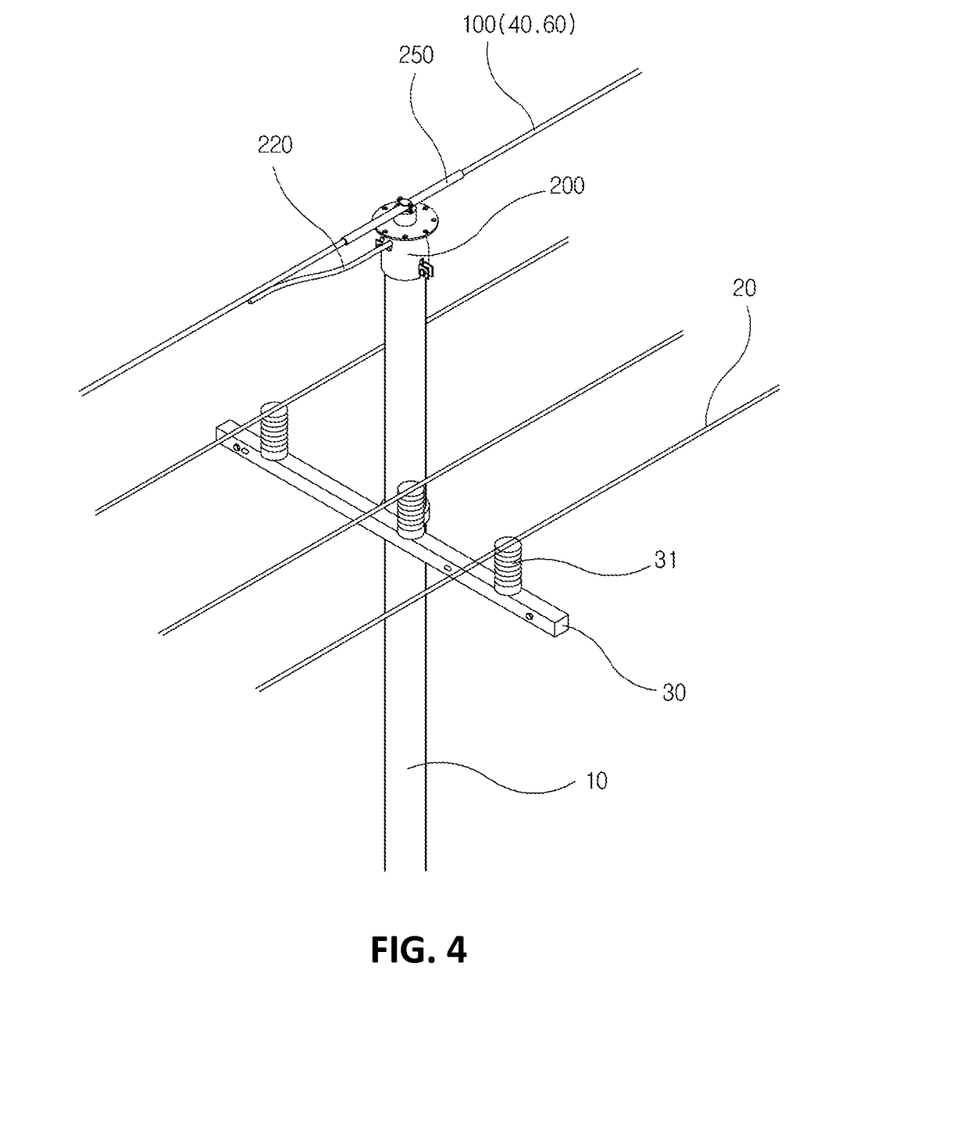
FIG. 4 is a view illustrating a construction state of a pin type electric pole using the method of constructing a distribution line using an extra-high voltage neutral line combined with an overhead earth wire having a separate installation structure of an extra-high voltage neutral line and a low-voltage neutral line of the present invention.

Accordingly, for an example of the installation, when applying to the pin type electric pole (straight line pole) as illustrated in FIG. 4, a multi-cap 200 is installed at an uppermost end of the electric pole 10 to install the integrated overhead earth wire and extra-high voltage neutral line 100, in which the multi-cap 200 is installed at the uppermost end of the electric pole 10 by using a coupling cap which forms a lower structure of the multi-cap.

Then, the integrated overhead earth wire and extra-high voltage neutral line 100 is installed at an upper end of the multi-cap 200, in which the integrated overhead earth wire and extra-high voltage neutral line 100 is fixed by a clamp formed on an upper surface of a plate of the multi-cap 200.

Figure 5:
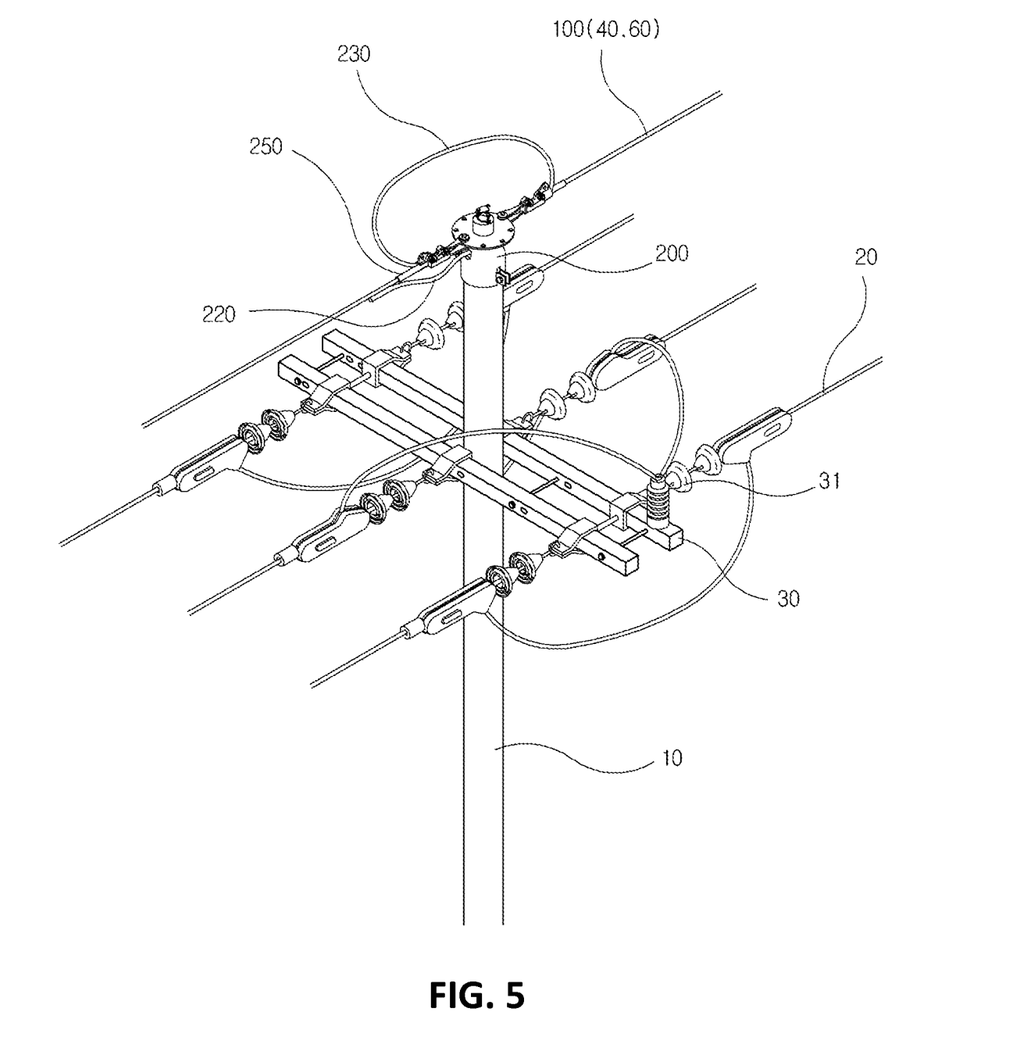
FIG. 5 is a view illustrating a construction state of a strain type electric pole using the method of constructing a distribution line using an extra-high voltage neutral line combined with an overhead earth wire having a separate installation structure of an extra-high voltage neutral line and a low-voltage neutral line of the present invention.

In addition, when applying to the strain type electric pole (angular pole) as illustrated in FIG. 5, a multi-cap 200 is installed at the uppermost end of the electric pole 10 to install the integrated overhead earth wire and extra-high voltage neutral line 100, in which the multi-cap 200 is installed at the uppermost end of the electric pole 10 by using a coupling cap which forms the lower structure of the multi-cap.

Then, the integrated overhead earth wire and extra-high voltage neutral line 100 is installed on the plate formed on the upper part of the multi-cap 200.

In this case, an aluminum tape 250 may be wrapped around a connection part of the multi-cap 200 of the integrated overhead earth wire and extra-high voltage neutral line 100 in a length of about 60 cm to cover the integrated overhead earth wire and extra-high voltage neutral line 100 in such a manner that the integrated overhead earth wire and extra-high voltage neutral line 100 is prevented from being damaged from vibration, in which each end part of the middle part of the integrated overhead earth wire and extra-high voltage neutral line 100, which is covered by the aluminum tape 250, is normally fixed by a dead-end clamp (not illustrated) and the integrated overhead earth wire and extra-high voltage neutral line 100 is installed through the through hole of the plate by using the dead-end clamp.

In this case, when the line is disconnected, each of the integrated overhead earth wire and extra-high voltage neutral line 100 is connected by using a jumper wire 230 as in a typical overhead earth wire connecting method.

Figure 6:
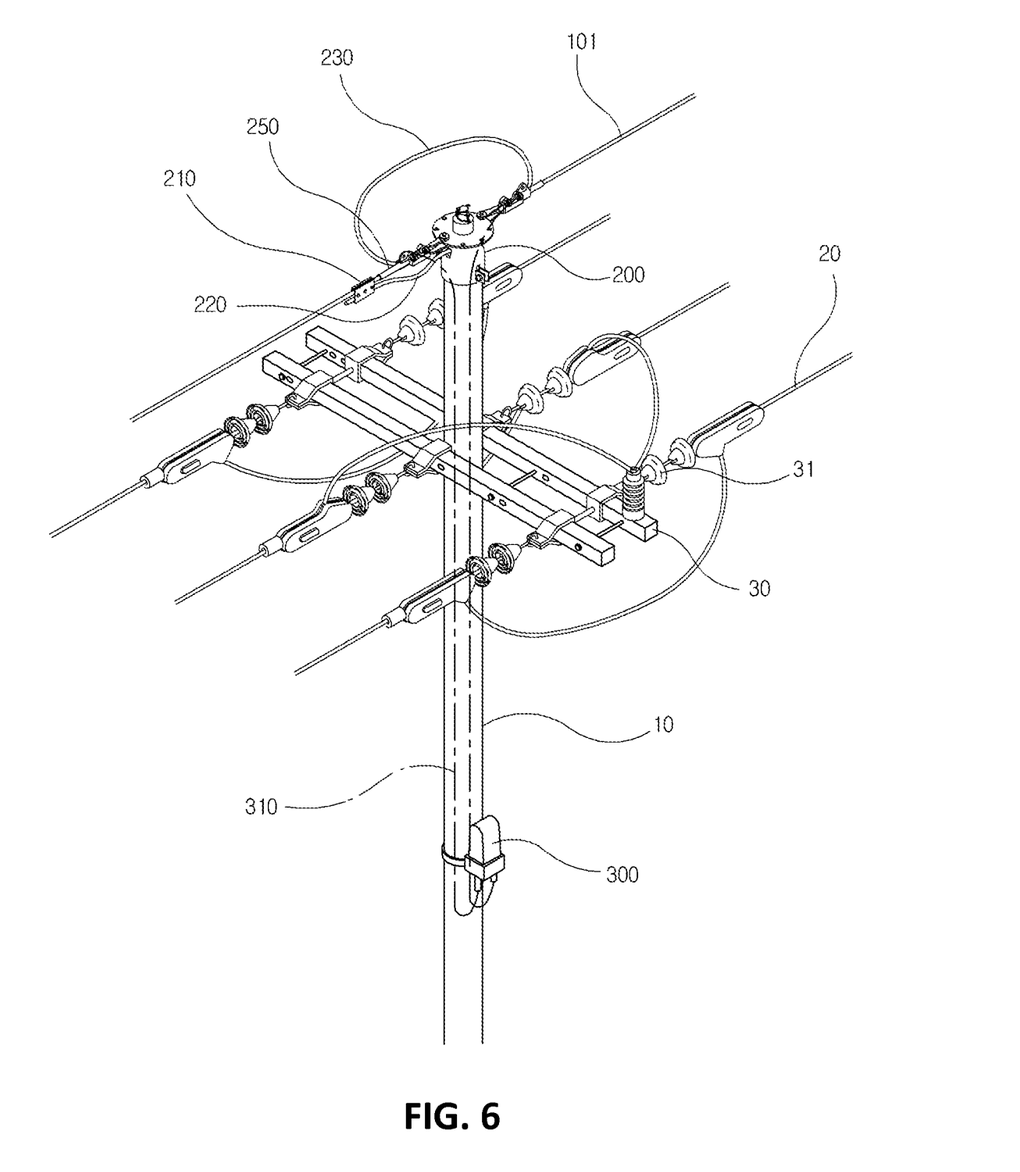
FIG. 6 is another view illustrating a construction state of a strain type electric pole using the method of constructing a distribution line using an extra-high voltage neutral line combined with an overhead earth wire having a separate installation structure of an extra-high voltage neutral line and a low-voltage neutral line of the present invention.

Meanwhile, as illustrated in FIG. 6 with reference to FIG. 3, when applying the integrated optical neutral ground line 101 to the strain type electric pole (angular pole), the integrated optical neutral ground line 101 is installed on the plate at the upper part of the multi-cap 200, in which a connection box 300 is further provided on the electric pole 10, each of the disconnected integrated optical neutral ground line 101 is withdrawn to the connection box by using the connecting wire 310 and connected to the connection box 300.

In addition, when grounding, one side of the integrated optical neutral ground line 101 is connected to the ground wire 220 by using a PG clamp 210, and the ground wire 220 is grounded to earth through the electric pole 10.

In this case, an aluminum tape 250 may be wrapped around a connection part of the multi-cap 200 of the integrated optical neutral ground line 101 in a length of about 60 cm to cover the integrated optical neutral ground line 101 in such manner that the integrated optical neutral ground line 101 is prevented from being damaged from vibration, in which, after the middle part, which is covered by the aluminum tape 250, of the integrated optical neutral ground line 101 is disconnected, each end part is normally fixed by a dead-end clamp (not illustrated) and the integrated optical neutral ground line 101 is installed through the through hole of the plate by using the dead-end clamp.

In this case, when disconnected, each of integrated optical neutral ground line 101 is connected by using a jumper wire 230 as in a typical overhead earth wire connecting method.

Meanwhile, when grounding, the ground wire 220, which is wired along the electric pole 10, may be arranged by using a grounding saddle (not illustrated) as described in Registered Patent No. 10-0824216, which has been filed by the applicant.

As described, in the method of constructing a distribution line using an extra-high voltage neutral line combined with an overhead earth wire having a separate installation structure of an extra-high voltage neutral line and a low-voltage neutral line, the distribution equipment is simplified so that the weight of the electric pole is reduced, power quality is improved, construction quality is improved and construction costs are reduced.

In addition, by grounding every electric pole, lightning shielding and surge current separating effects are improved thereby reducing surge voltage so that the number of power line disconnection can be reduced.

In addition, the extra-high voltage neutral line and the low-voltage neutral line do not use the same wire, thereby preventing the secondary neutral line connecting point of the transformer from being disconnected.

The invention claimed is:
1. A method of constructing a distribution line using an extra-high voltage neutral line combined with an overhead earth wire having a separate installation structure of the extra-high voltage neutral line and a low-voltage neutral line, in which a distribution line includes a power line provided at an upper part of an electric pole through a crossarm having an insulator, an overhead earth wire provided at an upper end of the electric pole, a transformer provided below the power line and positioned at a low-voltage jointed area, a low-voltage neutral line combined with an extra-high voltage neutral line provided below the transformer in parallel with the power line, and a low-voltage line provided at a position corresponding to the low-voltage jointed area, the method comprising:
   separating the low-voltage neutral line and the extra-high voltage neutral line, configuring the overhead earth wire and the extra-high voltage neutral line into an integrated overhead earth wire and extra-high voltage neutral line and installing the integrated overhead earth wire and extra-high voltage neutral line on a top end of the electric pole by using a multi-cap;
   connecting the transformer and the integrated overhead earth wire and extra-high voltage neutral line by installing the low-voltage neutral line and the low-voltage line so that the low-voltage neutral line and the low-voltage line are connected to a low-voltage load part of the electric pole, in which the transformer is installed, below the transformer in the low-voltage jointed area such that a low-voltage load current is prevented from flowing through the integrated overhead earth wire and extra-high voltage neutral line; and installing a ground at the electric pole, in which the transformer of the low-voltage jointed area connected to the integrated overhead earth wire and extra-high voltage neutral line is installed, and at the electric pole in which an arrester or a switch is installed and ground-connecting the integrated overhead earth wire and extra-high voltage neutral line to the remaining electric pole so that the ground is installed to every electric pole.

2. The method according to claim 1, wherein in the case of a pin type pole, the integrated overhead earth wire and extra-high voltage neutral line passes through an upper end of the multi-cap and is fixed to the multi-cap, and one side of the integrated overhead earth wire and extra-high voltage neutral line is connected to a ground wire to ground the integrated overhead earth wire and extra-high voltage neutral line.

3. The method according to claim 1, wherein, in the case of an strain type pole, the separated overhead earth wire and the separated extra-high voltage neutral lines are fixed to a circumference of the multi-cap, each of the overhead earth wire and the extra-high voltage neutral line is connected by using a jumper wire, and the overhead earth wire and the extra-high voltage neutral line connected to the jumper wire are connected to a ground wire for grounding.

4. The method according to claim 1, wherein the integrated overhead earth wire and extra-high voltage neutral line comprises an integrated optical neutral ground line comprising multiple aluminum wires provided at an outermost circumference from a center part, multiple carbon steel wires provided at an inner part of the aluminum wires and an optical communication wire provided between the carbon steel wires.

5. The method according to claim 4, wherein the integrated optical neutral ground line is fixed at a circumference of a multi-cap, a connection box is further provided on the electric pole, the integrated optical neutral ground line is withdrawn from the connection box and connected to the connection box by using a connection wire, and a ground wire is withdrawn from one side of the integrated optical neutral ground line and grounded by using a PG clamp.

6. The method according to claim 1, wherein an aluminum tape is wrapped around a connection part of the multi-cap of the integrated overhead earth wire and extra-high voltage neutral line or the integrated optical neutral ground line to cover the integrated overhead earth wire and extra-high voltage neutral line or integrated optical neutral ground line.

7. The method according to claim 2, wherein an aluminum tape is wrapped around a connection part of the multi-cap of the integrated overhead earth wire and extra-high voltage neutral line or the integrated optical neutral ground line to cover the integrated overhead earth wire and extra-high voltage neutral line or integrated optical neutral ground line.

8. The method according to claim 3, wherein an aluminum tape is wrapped around a connection part of the multi-cap of the integrated overhead earth wire and extra-high voltage neutral line or the integrated optical neutral ground line to cover the integrated overhead earth wire and extra-high voltage neutral line or integrated optical neutral ground line.

9. The method according to claim 4, wherein an aluminum tape is wrapped around a connection part of the multi-cap of the integrated overhead earth wire and extra-high voltage neutral line or the integrated optical neutral ground line to cover the integrated overhead earth wire and extra-high voltage neutral line or integrated optical neutral ground line.

10. The method according to claim 5, wherein an aluminum tape is wrapped around a connection part of the multi-cap of the integrated overhead earth wire and extra-high voltage neutral line or the integrated optical neutral ground line to cover the integrated overhead earth wire and extra-high voltage neutral line or integrated optical neutral ground line.

* * * * *